(12) United States Patent
Wahl et al.

(10) Patent No.: US 11,491,737 B2
(45) Date of Patent: Nov. 8, 2022

(54) ROBUST METHOD FOR BONDING OPTICAL MATERIALS

(71) Applicant: RAYTHEON COMPANY, Waltham, MA (US)

(72) Inventors: Joseph M. Wahl, Lexington, MA (US); Richard Gentilman, Acton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 559 days.

(21) Appl. No.: 16/140,837

(22) Filed: Sep. 25, 2018

(65) Prior Publication Data

US 2020/0094487 A1    Mar. 26, 2020

(51) Int. Cl.
| | |
|---|---|
| *B32B 3/26* | (2006.01) |
| *B29C 65/00* | (2006.01) |
| *B29C 65/48* | (2006.01) |
| *B29C 65/54* | (2006.01) |

(52) U.S. Cl.
CPC .......... *B29C 66/472* (2013.01); *B29C 65/483* (2013.01); *B29C 65/548* (2013.01); *B29C 66/028* (2013.01); *B29C 66/0246* (2013.01); *B29C 66/474* (2013.01); *B32B 3/26* (2013.01); *Y10T 428/24744* (2015.01)

(58) Field of Classification Search
CPC ... B32B 3/26; B32B 3/30; G02F 1/377; G02F 1/3775; Y10T 428/24744; Y10T 428/24562; B29C 65/483; B29C 65/548; B29C 66/028; B29C 66/0246; B29C 66/472; B29C 66/474; B81C 1/00071; B81C 3/00; B81C 3/001; B81C 3/002; B81C 3/004; B81C 3/005

USPC .................................................. 428/166, 188
See application file for complete search history.

(56) References Cited

U.S. PATENT DOCUMENTS

| | | | |
|---|---|---|---|
| 4,118,676 A | * | 10/1978 | Redman .................. G02F 1/335 359/305 |
| 5,669,997 A | | 9/1997 | Robbert et al. |
| 5,846,638 A | | 12/1998 | Meissner |
| 5,852,622 A | | 12/1998 | Meissner et al. |
| 6,361,958 B1 | | 3/2002 | Shieh et al. |
| 2002/0174686 A1 | * | 11/2002 | Krulevitch .......... B81C 1/00071 65/41 |
| 2003/0190608 A1 | * | 10/2003 | Blackburn ........ B01L 3/502715 435/6.11 |
| 2006/0286710 A1 | | 12/2006 | Sugita et al. |
| 2007/0137059 A1 | | 6/2007 | Holzapfel et al. |

(Continued)

FOREIGN PATENT DOCUMENTS

KR       20120085816 A      8/2012

OTHER PUBLICATIONS

Babic et al., "Wafer Fusion for Surface-Normal Optoelectronic Device Applications", International Journal of High Speed Electronics, vol. 08, No. 02, Jun. 20, 1997, pp. 357-376.

(Continued)

*Primary Examiner* — Catherine A. Simone
(74) *Attorney, Agent, or Firm* — Cantor Colburn LLP

(57) ABSTRACT

An optical element includes an optical material including a first edge and an opposing second edge. The optical element further includes a plurality of micro-channels arranged within the optical material. Each of the micro-channels of the plurality of micro-channels extends from the first edge to the second edge of the optical material.

6 Claims, 5 Drawing Sheets

(56) References Cited

U.S. PATENT DOCUMENTS

| | | | |
|---|---|---|---|
| 2009/0087640 A1* | 4/2009 | Li | H05K 7/20981 |
| | | | 428/304.4 |
| 2009/0142615 A1* | 6/2009 | Ekstein | C04B 37/006 |
| | | | 428/627 |
| 2010/0196207 A1* | 8/2010 | Steinmiller | G01N 33/54373 |
| | | | 422/82.09 |
| 2011/0317727 A1 | 12/2011 | Furuya et al. | |
| 2012/0321536 A1* | 12/2012 | Kokini | B29C 66/7394 |
| | | | 422/502 |
| 2013/0011626 A1* | 1/2013 | Dumond | B32B 27/308 |
| | | | 428/407 |
| 2017/0242345 A1* | 8/2017 | Lipson | G03F 7/70875 |

OTHER PUBLICATIONS

Notification of Transmittal of the International Search Report and the Written Opinion of the International Searching Authority PCT/US2019/049902 dated Nov. 26, 2019.

International Preliminary Report on Patentability PCT/US2019/049902 dated Mar. 23, 2021, 9 pages.

China Office Action dated Mar. 15, 2022; Application No. 201980057493.3 (11 pages), with English translation.

* cited by examiner

ROBUST METHOD FOR BONDING OPTICAL MATERIALS

BACKGROUND

The present disclosure relates to optics, and more specifically, to methods and resulting structures for bonding optical materials.

Optical contact bonding includes joining, without an adhesive, two optical surfaces by intermolecular forces, for example, Van der Waals forces, hydrogen bonds, and dipole-dipole interactions. Such intermolecular forces are typically not sufficiently strong to hold two apparently rigid bodies together because the forces drop off rapidly with distance, and the actual area in contact between the two bodies is small due to surface roughness and minor imperfections. However, if the surfaces are sufficiently conformal (or practically flat and smooth), then a sufficient surface area is in close enough contact for the intermolecular interactions to bond to one another. Heat can then be applied to induce atomic diffusion and form a strong, permanent and optically transparent bond.

For optical contact bonding to occur, the optical surfaces must also be clean and free from any small contamination that would prevent or weaken the bond, including grease films and dust. Thus, precise surface finishing and cleaning of the surfaces must be performed prior to forming the contact bond. The interface between the two parts disappears, and the physical properties of the resulting bound object are the same as the parts joined.

SUMMARY

According to one or more embodiments, an optical element includes an optical material including a first edge and an opposing second edge. The optical element further includes a plurality of micro-channels arranged within the optical material. Each of the micro-channels of the plurality of micro-channels extends from the first edge to the second edge of the optical material.

According to other embodiments, an optical element includes an optical material including a first planar face and an opposing second planar face. The optical element further includes a plurality of micro-channels arranged within the optical material. Each of the micro-channels of the plurality of micro-channels extends to an edge of at least the first planar face of the optical material.

According to some embodiments, a method of fabricating an optical element includes providing a first material part and a second material part. The method further includes forming a plurality of micro-channels on a surface of the first material part. The method includes contacting the first material part to the second material part to form a bond and such that the plurality of micro-channels of the first material part is arranged at an interface between the first material part and the second material part.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Turning now to an overview of technologies that are more specifically relevant to aspects of the invention, high temperatures used following the contact bonding processes can create permanent voids in unpredictable locations at the interface between the surfaces. The voids can result from adsorbed species evolved during the high temperature bonding process and be up to several millimeters (mm) in dimension. The defects can degrade the optical and mechanical properties of the component produced. Preventing the formation and permanence of these voids is important to produce high quality, permanently bonded optically transparent components with optimal mechanical and optical properties.

One method for producing optically bonded single crystal and polycrystalline optical components includes incorporating a foreign material at the interface. However, such methods can produce optical components with sub-optimal properties.

In optical contact bonding of semiconductor wafers, in which a thin semiconductor material, such as silicon, is bonded to a thick slab of material, void formation can be avoided at the interface by flexing and unrolling the thinner flexible silicon as it is brought into contact with the thick slab, which pushes the voids out of the bonded area. However, this approach cannot be used for thick, rigid optical surfaces that cannot be flexed. For example, this approach would not apply to individual window tiles that are bonded to form large (e.g., up to 1 meter in length and/or width) window blanks, or large planar waveguide (PWG) laser slabs.

Turning now to an overview of the aspects of the invention, one or more embodiments of the invention address the above-described shortcomings by providing methods and resulting structures that include surface features (e.g., micro-channels) that are applied to at least one surface of the mating pair of optical substrates. The features are small enough that they do not significantly affect the mechanical or optical properties of the produced component subsequent to optical contact formation. The surface features can be applied to optical and non-optical surfaces of any size, including large sapphire or optical ceramic window tiles, such as spinel, yttria, nanocomposite optical ceramics (NCOC), aluminum oxynitride (ALON), and combinations thereof, or PWG laser slabs.

The above-described aspects of the invention address the shortcomings of the prior art by using surface features (e.g., micro-channels) to provide an escape path for any entrapped gasses or voids, preventing the formation of voids that may render the resulting bonded component unusable.

Figure 1:
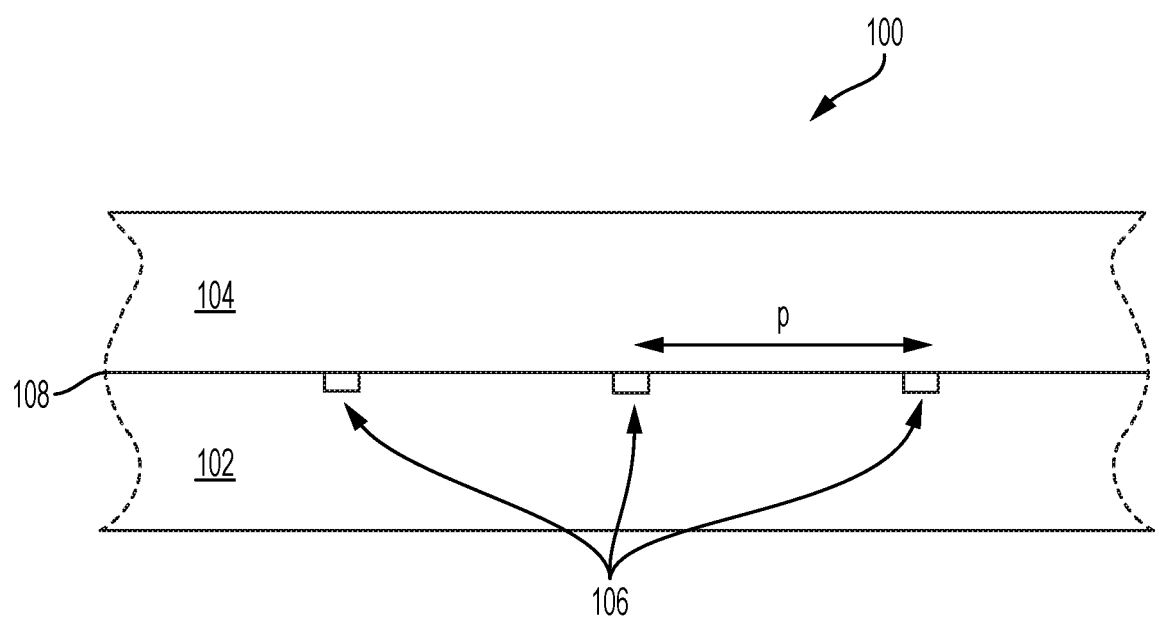
FIG. 1 is a side view of bonded parts according to embodiments of the present invention.
Figure 2:
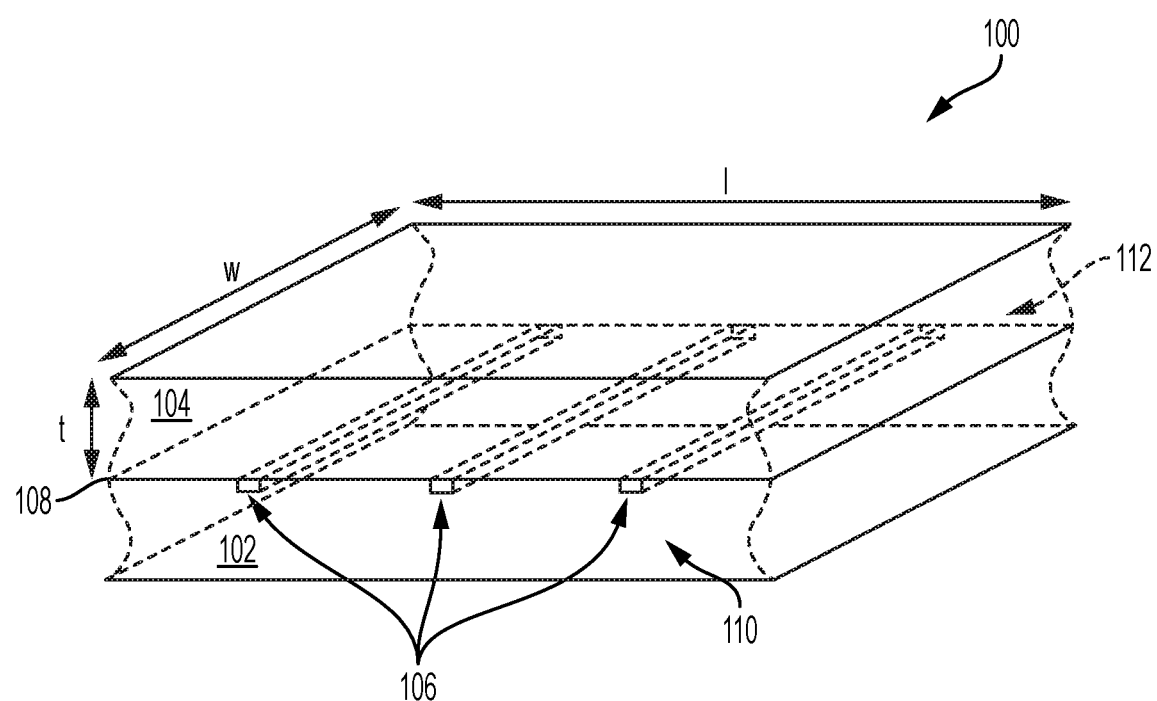
FIG. 2 is a perspective view of a FIG. 1.

Turning now to a more detailed description of aspects of the present invention, FIG. 1 is a side view of contact bonded parts according to embodiments of the present invention. FIG. 2 is a perspective view of a FIG. 1. A single optical component 100 is formed by contacting a first material part 102 to a second material part 104 to form a contact bond at the interface 108 between the two surfaces. The first material part 102 and the second material part 104 each includes the same or different materials. First material part 102 and second material part 104 can include one or more optical materials, non-optical materials, or a combination thereof.

According to one or more embodiments of the present invention, the first material part 102 and the second material part 104 each includes an optical material, for example, ceramic or single crystal material(s), such as spinel, yttria, nanocomposite optical ceramics (NCOC), aluminum oxynitride (ALON), yttrium aluminum garnet (YAG). The materials can be doped with an active ion dopant, for example, neodymium (Nd:YAG) or ytterbium (Yb:YAG). According to other embodiments, the first material part 102 and the second material part 104 each includes ceramic or single crystal undoped YAG. Yet, according to one or more embodiments, the first material part 102 and the second material part 104 each includes other optically transparent materials, such as sapphire.

According to some embodiments of the invention, the first material part 102 and the second material part 104 each includes an elongated generally rectangular or square slab of material. Although, the size and shape of the first material part 102 and second material part 104 are not limited to these shapes and can be any shape provided that they include surfaces having sufficient flatness and smoothness that can be contact bonded (see FIG. 5 for details).

According to some embodiments, the slabs of the first material part 102 and second material part 104 include a first flat bond face, a second flat bond face, and four lateral faces. According to some embodiments, each slab of the first material part 102 and second material part 104 has a thickness (t) of about 1 to about 15 millimeters (mm), a width (w) of about 10 to about 100 mm, and a length of about 50 to about 500 mm (see FIG. 2). According to other embodiments, each slab of the first material part 102 and second material part 104 has a thickness (t) of about 100 to about 250 mm, a width (w) of about 5 to about 20 mm, and a length of about 100 to about 250 mm.

A plurality of micro-channels 106 is formed at the surface of the first material part 102 that will interface with (at interface 108) the second material part 104. The first material part 102 as shown includes a first edge 110 and an opposing second edge 112, and the plurality of micro-channels 106 arranged extend from the first edge 110 to the second edge 112 of the material.

The shape and dimensions of each of the micro-channels 106 varies, depending on the type of materials used. Each of the micro-channels 106 can have, for example, a circular, oval, square, or rectangular cross-sectional shape. According to some embodiments, each of the micro-channels 106 has a depth of about 10 to about 600 nm. In other embodiments, the pitch (p) (or center-to-center distance of nearest-neighbor features) of the plurality of micro-channels 106 is about 100 to about 2000 micrometers. In exemplary embodiments, each of the micro-channels 106 has a depth of about 25 to about 75 nm and a pitch (p) of about 500 to about 700 micrometers.

The surface coverage of the plurality of micro-channels 106 on the first surface 102 is about 0.1 to about 1.5% according to some embodiments. According to other embodiments, the surface coverage of the plurality of micro-channels 106 is about 0.01 to about 5% according to other embodiments. According to some embodiments, the plurality of micro-channels 106 are parallel to one another. Yet, in other embodiments, the plurality of micro-channels 106 are not parallel to one another. In some embodiments, the plurality of micro-channels 106 are uniformly spaced. Yet in other embodiments, the plurality of micro-channels 106 are not uniformly spaced.

The plurality of micro-channels 106 is formed in the first material part 102 by methods that are suitable for the particular material. The plurality of micro-channels 106 can be formed in the first material part 102 by methods that include, for example, contact masking, lithographic patterning, ion milling, chemical etching, plasma etching, or a combination thereof.

Introducing the micro-channels 106 on one surface of the pair to be joined provides an escape path for any entrapped air, gas, or volatile species liberated at the interface 108 or bond-line of the contact bond. However, the features are small enough that they do not affect the mechanical or optical properties of the materials. After forming the plurality of micro-channels 106 in the first material part 102, the first material part 102 and the second material part 104 are cleaned to remove contaminants and then bonded together to form the single optical component 100. Bonding includes optically contacting the first material part 102 with the second material part 104, followed by high temperature heat treatment to complete the bonding, which is described in further detail below with reference to FIG. 5.

Figure 3:
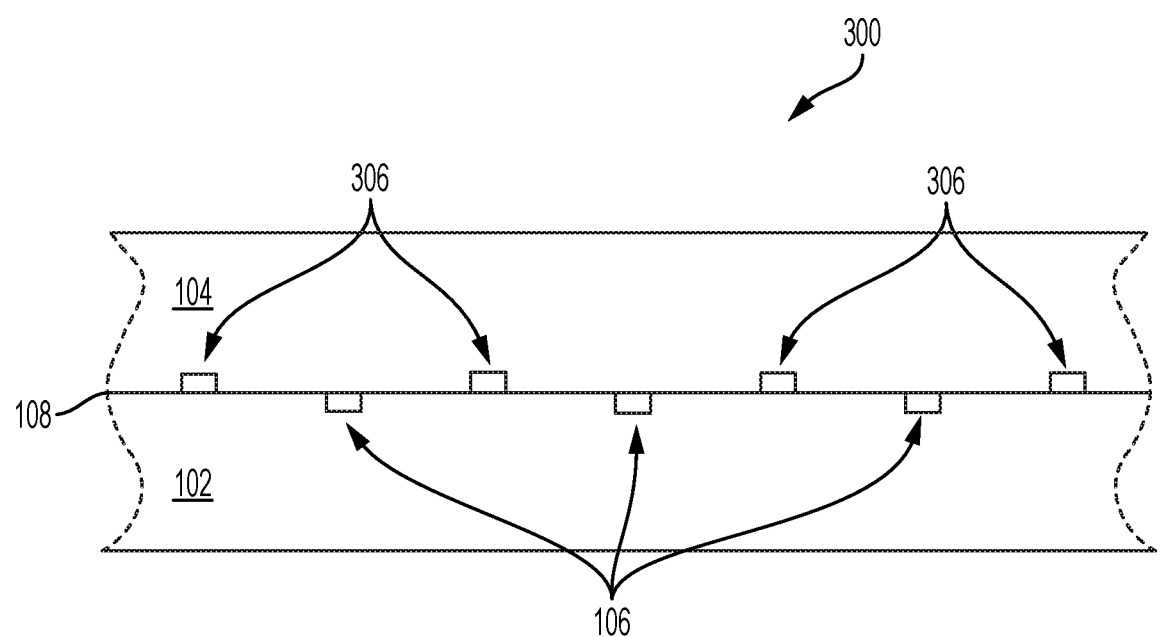
FIG. 3 is a side view of bonded parts according to embodiments of the present invention.

FIG. 3 is a side view of bonded parts according to embodiments of the present invention. The bonded optical component 300 includes the first material part 102 with a plurality of micro-channels 106 at the interface 108 with the second material part 104, which also includes a plurality of micro-channels 306. The plurality of micro-channels 306 in the second material part 104 have the features described above for the plurality of micro-channels 106 in the first material part 102.

As shown in the embodiments shown in FIGS. 1-3, the flat faces of each slab of material (first material part 102 and second material part 104) are bonded together to form face-bonded components. Face bonding can be used to form large PWG laser slabs, for example.

Figure 4:
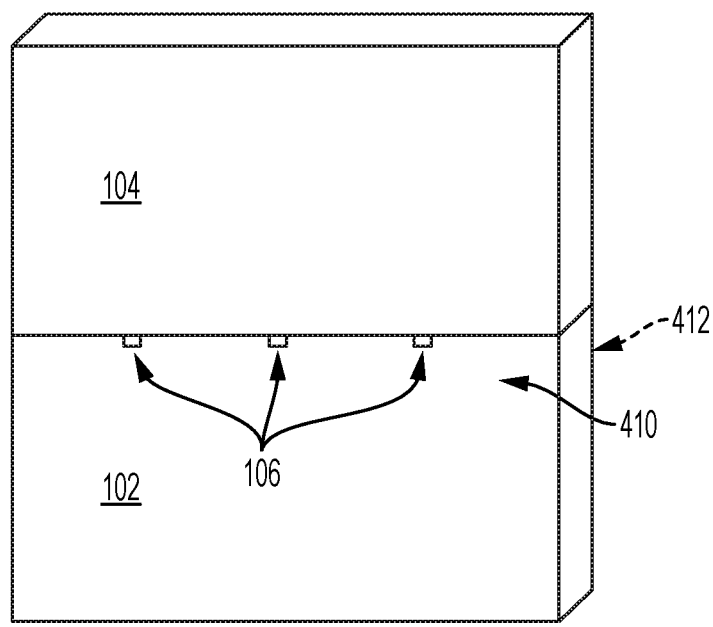
FIG. 4 is a perspective view of bonded parts according to embodiments of the present invention.

The described methods also can be used to form edge-bonded components. FIG. 4 is a perspective view of bonded parts according to other embodiments of the present invention, in which edges of the first material part 102 and second material part 104 are bonded. The plurality of micro-channels 106 can be formed in the edge of at least the first material part 102, and bonded to the edge of the second material part 104. According to some embodiments, the plurality of micro-channels 106 within the first material part 102 extends from a first planar face 410 to the opposing second planar face 412 of the material. Yet, according to other embodiments, the plurality of micro-channels 106 intersect only one side of the parts, for example, the first planar face 410.

Figure 5:
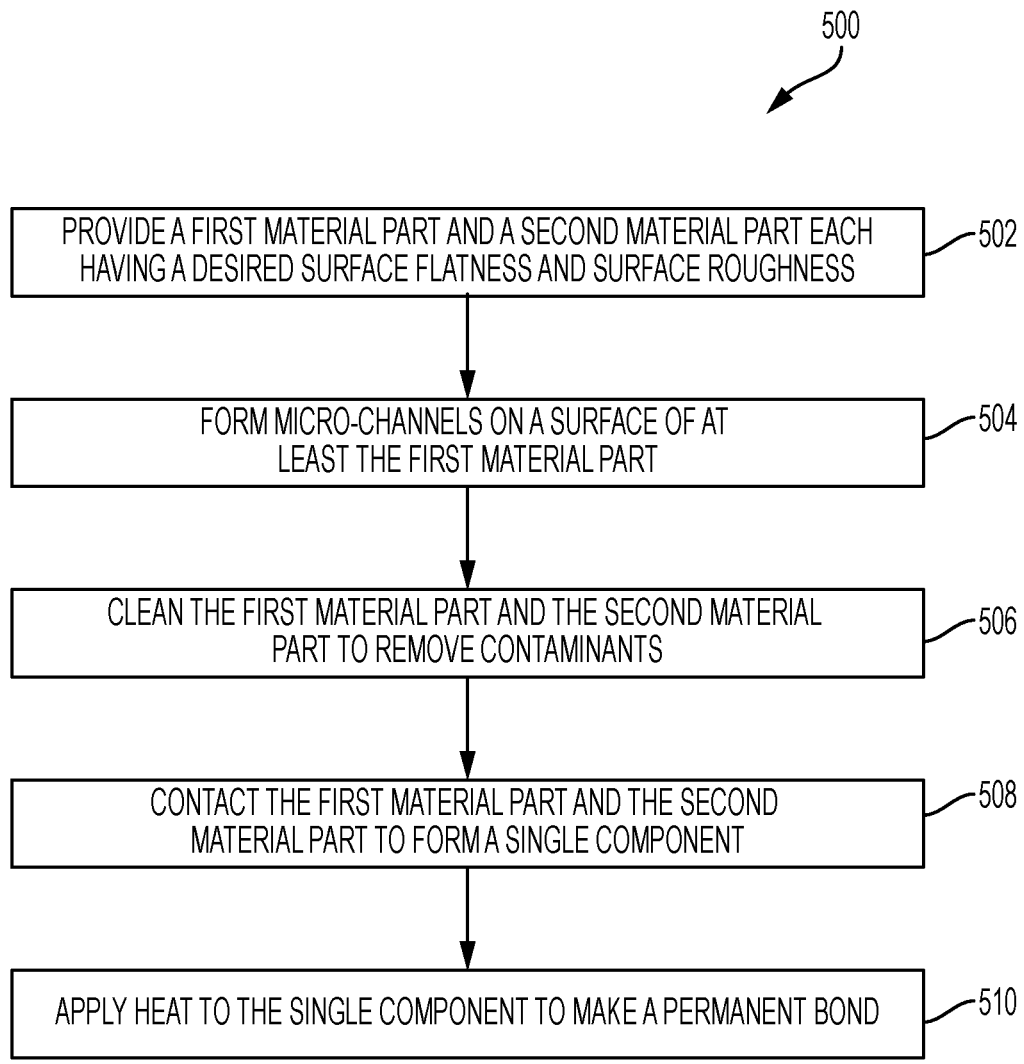
FIG. 5 is a flow chart illustrating a method for bonding according to embodiments of the present invention.

FIG. 5 is a flow chart illustrating a method 500 for bonding parts according to embodiments of the present invention. As shown in box 500, the method 500 includes providing a first material part and a second material part, each having a desired surface flatness and surface roughness. The first material part and the second material part are polished to provide desired properties.

Optical contacting, the first step in achieving a permanent bond, includes bringing two surfaces into close atomic-scale proximity to each other over the entire area of the bond surfaces. This atomic-scale proximity allows temporary and relatively weak bonds to form across the interface between atoms on opposite sides of the interface, by Van Der Waals bonds, for example. A successful contact requires that these temporary bonds form between most of the atoms present on the opposite surfaces, both on a short (i.e., a few micrometers or less) dimensional scale, as well over the longest dimension of the components (i.e., many centimeters or more). The most practical way to bring the two surfaces to be bonded into close atomic-scale contact across the interface is to polish both surfaces to a high degree of planar precision. Flatness specifies the planar precision over large area dimensions, while roughness specifies the precision over local small scales. Successful optical contacting requires planar precision over the entire area of both size scales. Therefore, both surfaces to be bonded are polished and then measured. Large area flatness can be measured by temporary optical contact with a reference flat or by optical interferometry. Local scale roughness is measured using optical or mechanical profilometry or by white light interferometry.

Surface flatness is a type of surface accuracy specification that measures the deviation of a flat surface. The deviations in flatness are often measured in values of waves ($\lambda$), which are multiples of the wavelength of the testing source. One fringe corresponds to ½ of a wave. For example, flatness is considered typical grade, $\lambda/4$ flatness is considered to be precision grade, and $\lambda/20$ is considered high precision grade. According to some embodiments, the first material part and the second material part are finished to a surface flatness of less than $\frac{1}{10}\lambda$.

Surface finish, also known as surface roughness, measures small scale irregularities on a surface, such as the short range spatial roughness of very fine surface scratches left behind by polishing abrasives, for example. For example, manufacturing tolerances for surface finish range from 50 Å RMS for typical quality, 20 Å RMS for precision quality, and 5 Å, RMS for high quality. According to some embodiments, the first material part and the second material part are finished to a surface roughness of less than 10 Å RMS.

As shown in box 504, the method 500 includes forming micro-channels on at least the first material part. The micro-channels can be formed on the edges (edge-bonded component) or the faces (face-bonded component) of at least the first material part, or both the first material part and the second material part.

As shown in box 506, the method 500 includes cleaning the surfaces of first material part and the second material part to remove contaminants. Contaminants include, for example, organic compounds, inorganic compounds, metals, and particulates. Contamination on the material surfaces can render the surfaces unsuitable. Organic solvents, e.g., acetone, methanol, and isopropyl alcohol; acids, e.g., hydrochloric acid, nitric acid, hydrofluoric acid, and sulfuric acid; bases, e.g., sodium hydroxide and ammonium hydroxide; filtered, de-ionized water, or a combination thereof, can be used to clean the surfaces. The methods used to clean the surfaces depends on the substrate being treated and the type of potential contamination present.

As shown in box 508, the method 500 includes contacting the first material part and the second material part to form a single component. Contacting, e.g., optical contacting, is performed in a clean environment to prevent re-contamination at the interface of the contact bond.

As shown in box 510, the method 500 includes applying heat to the single component to make a permanent bond. The micro-channels formed in the surface of at least the first material part at the interface allows gases that can be generated during heat treatment escape, preventing void formation. Heat is applied by placing the parts in a high temperature furnace or kiln to promote atomic diffusion and to make a permanent bond. The parts are placed in a fixture to prevent shifting during loading and heat treatment of the contacted parts. According to some embodiments, the temperature used to make a permanent bond is about 1000 to about 2000° C., depending on the material(s) being bonded and the temperatures at which atomic diffusion occurs in the material(s).

After bonding is completed between the two material parts, a single component (e.g., an optical element) is formed, in which the interface is no longer present. The enclosed methods and resulting structures prevent formation of voids formed during contact bonding. These methods and structures can be applied to a wide range of applications, including optical elements such as PWGs, prisms, beamsplitters, and the like. The methods and resulting structures can also be applied to optical materials that are edge bonded (e.g., small tiles are joined edge-to-edge) to form large windows.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An optical element, comprising:
   an optical material comprising a first planar surface, an opposing second planar surface, a first edge, and an opposing second edge, the first edge and the opposing second edge connecting the first planar surface to the opposing second planar surface, and the first planar surface having a finished surface roughness of less than 10 Å RMS; and
   a plurality of micro-channels arranged within the optical material, each of the micro-channels of the plurality of micro-channels is an enclosed aperture that extends from the first edge to the second edge of the optical material;
   wherein the optical element is a single component without a separate material arranged at an interface at the plurality of micro-channels; and
   wherein the optical material comprises single crystal undoped yttrium aluminum garnet (YAG), ceramic undoped YAG, single crystal doped YAG, ceramic doped YAG, sapphire, spinel, yttria, nanocomposite optical ceramics (NCOC), aluminum oxynitride (ALON), or a combination thereof.

2. The optical element of claim 1, wherein the single crystal doped YAG and ceramic doped YAG each comprises neodymium or (Nd:YAG) or ytterbium (Yb:YAG) as an active dopant.

3. The optical element of claim 1, wherein the plurality of micro-channels has a depth of about 10 to about 600 nanometers (nm).

4. The optical element of claim 1, wherein the plurality of micro-channels has a pitch of about 10 to about 2000 micrometers (μm).

5. The optical element of claim 1, wherein the optical element is a planar waveguide, a prism, or a beamsplitter.

6. An optical element, comprising:
   an optical material comprising a first planar surface, an opposing second planar surface, a first edge, and an opposing second edge, the first edge and the opposing second edge connecting the first planar surface to the opposing second planar surface, and the first planar surface having a finished surface roughness of less than 10 Å RMS; and
   a plurality of micro-channels arranged within the optical material, each of the micro-channels of the plurality of micro-channels is an enclosed aperture that extends from the first edge to the second edge of the optical material and has a depth of about 10 to about 600 nanometers (nm);
   wherein the optical element is a single component without a separate material arranged at an interface at the plurality of micro-channels; and
   wherein a surface coverage of the plurality of micro-channels on the optical material is about 0.01 to about 5%.

* * * * *